(No Model.) 3 Sheets—Sheet 3.
W. K. LIGGETT.
CORN HARVESTER.
No. 509,230. Patented Nov. 21, 1893.
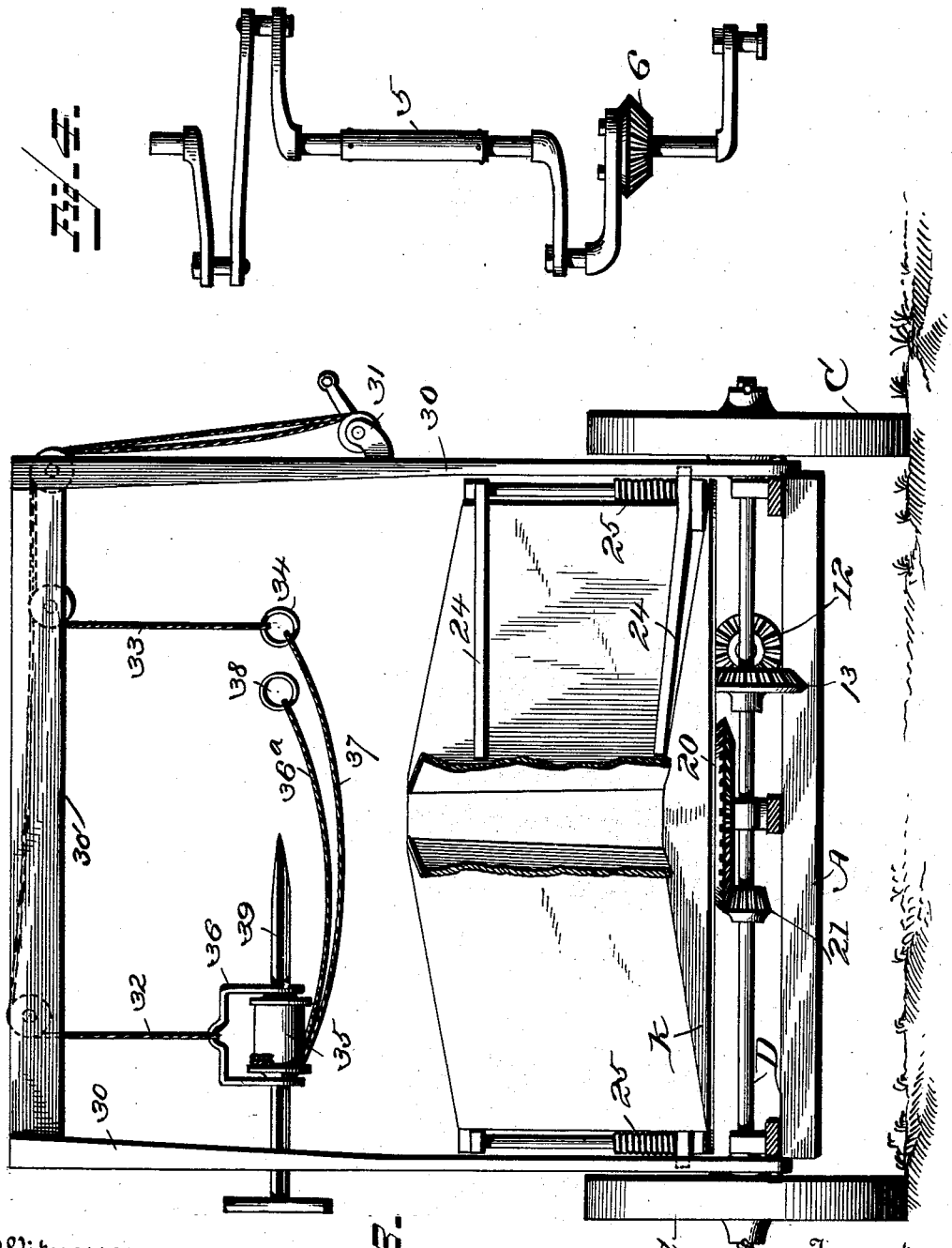
Witnesses
Albert Speiden
Van Buren Hillyard
Inventor
William K. Liggett.
By Attorneys R. S. & A. P. Lacey

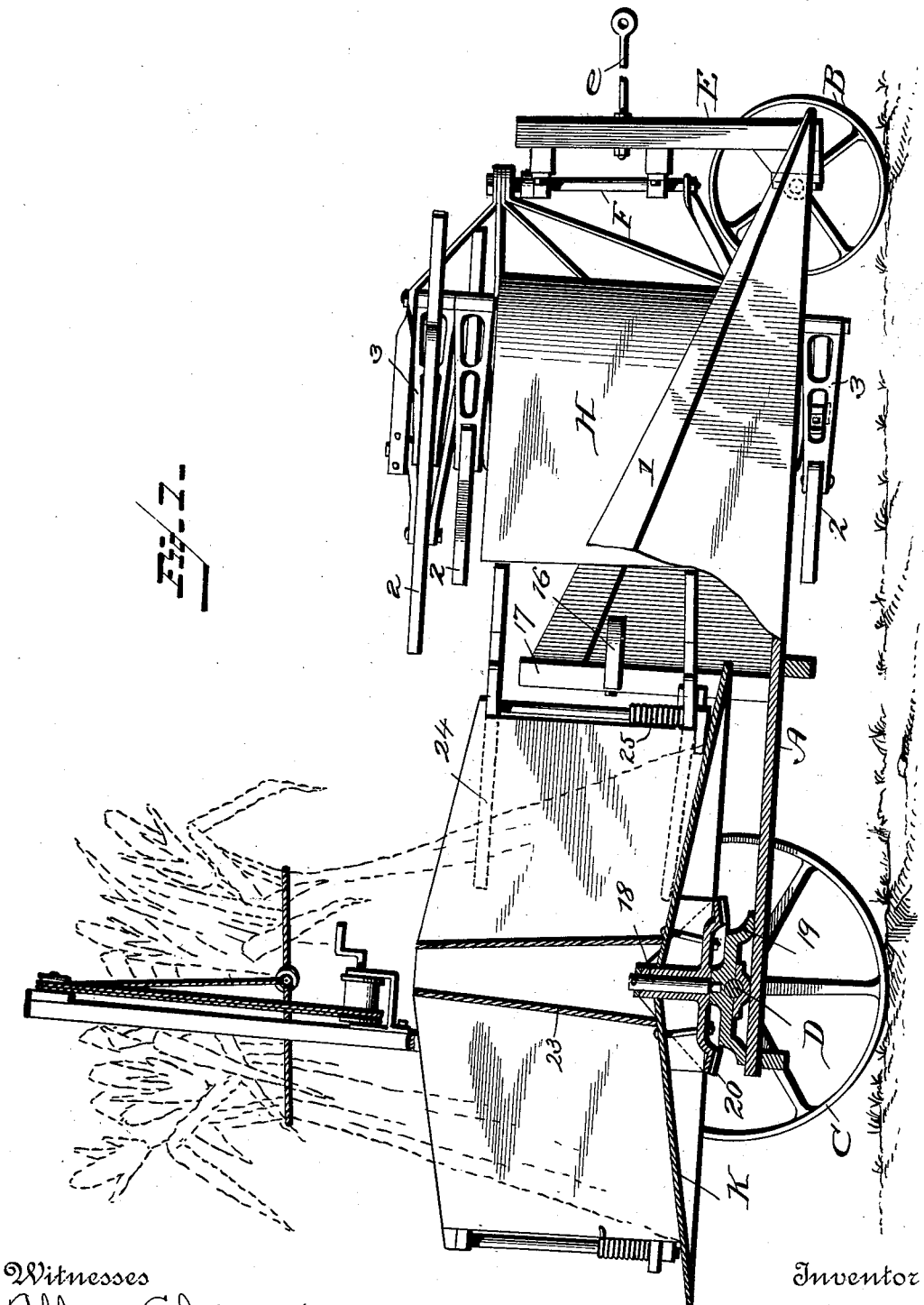

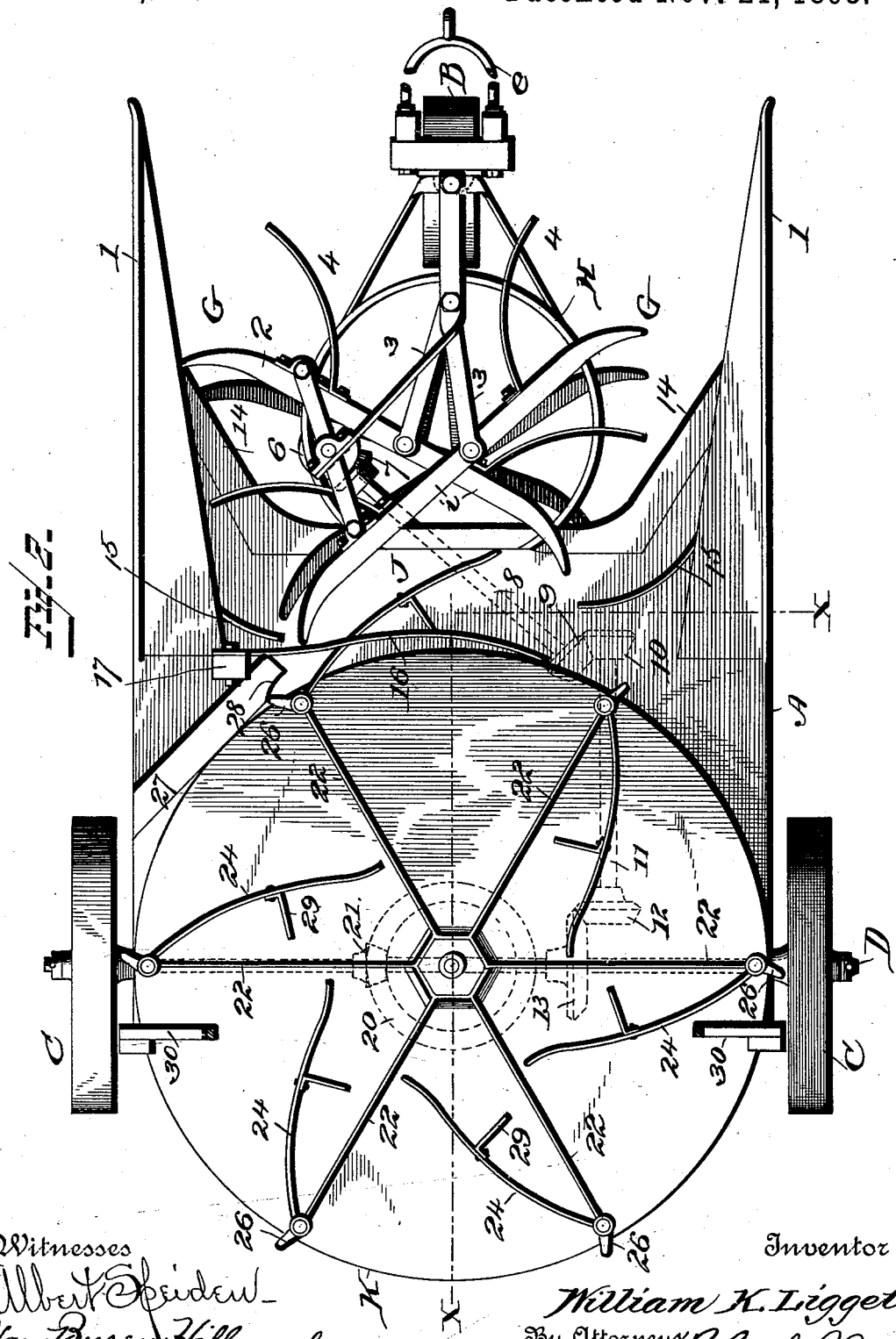

UNITED STATES PATENT OFFICE.

WILLIAM K. LIGGETT, OF COLUMBUS, OHIO.

CORN-HARVESTER.

SPECIFICATION forming part of Letters Patent No. 509,230, dated November 21, 1893.

Application filed December 27, 1892. Serial No. 456,377. (No model.)

*To all whom it may concern:*

Be it known that I, WILLIAM K. LIGGETT, a citizen of the United States, residing at Columbus, in the county of Franklin and State of Ohio, have invented certain new and useful Improvements in Corn-Harvesters; and I do hereby declare the following to be a full, clear, and exact description of the invention, such as will enable others skilled in the art to which it appertains to make and use the same.

The present invention has for its object to simplify the construction of corn harvesters that embody a revolving table on which the shock is formed in a series of compartments, and reduce the size and cost of the machine by dispensing with separate feeding mechanism for moving the stalks from the gathering mechanism to the shock forming table.

A further purpose of the invention is to improve the general construction of this class of agricultural machines and increase their usefulness and efficiency.

The invention consists of the novel features and the peculiar construction and combination of the parts which will be hereinafter more fully described and claimed and which are shown in the annexed drawings, in which—

Figure 1 is a side elevation of a corn harvesting machine embodying my invention, parts being broken away about on the line X X of Fig. 2. Fig. 2 is a top plan view of the machine, the upper portion of the derrick being broken away. Fig. 3 is a rear end view of the machine, parts being broken away. Fig. 4 is a detail view of the crank shaft, for actuating the gathering arms.

The platform A is supported on the caster wheel B and wheels C C that are mounted on the ends of the axles D. The caster wheel B is journaled in the lower end of a frame E which is mounted upon a post F so as to swing laterally, and is provided with a clevis $e$ to which the team is hitched. Guards 1 project forward from the sides of the platform and form passages G between their inner sides and a frame H which projects vertically from the said end of the platform. This frame H is approximately cylindrical in form, having its rear side flattened to provide a transverse passage or chamber J immediately in the rear of the frame H and directly in front of the shock forming table K.

The gathering arms 2 are pivotally attached midway of their ends to vibrating arms 3 and are provided with auxiliary tines 4 which supplement the action of the curved ends of the said gathering arms.

The crank shaft 5 having double crank arms at each end is provided near its lower end, preferably between the lower crank arm, with a beveled pinion 6 which meshes with a corresponding beveled pinion 7 on the outer end of a shaft 8, the latter having a beveled pinion 9 on the inner end which is in mesh with a beveled pinion 10 on the shaft 11. A beveled pinion 12 on the inner end of the shaft 11 meshes with a beveled gear wheel 13 on the axle D and is driven thereby. There are upper and lower gathering arms 2 which are provided with bearings to receive the crank arms at the ends of the crank shaft 5.

The knives 14 are located at the inner ends of the passages G and extend obliquely across the same.

Curved guards 15 are located at the ends of the passage J to give proper direction to the stalks as the same are moved onto the platform A by means of the gathering arms 2.

A yielding support 16 is provided at the rear side or passage J and sustains the stalks in an erect position while in and during the time they are carried from the passage J to the proper shock forming compartment on the table K. This yielding support 16 is secured at one end to a standard 17 projected vertically from the platform A and the other end of the said support 16 is free and adapted to yield to permit the stalks to be gathered into a shock forming compartment on the said table K.

The shock forming table K is journaled on a spindle 18 extended vertically from the casting 19 which is attached to the platform A.

The beveled gear 20 attached to the table K meshes with a pinion 21 on the shaft D and is actuated thereby to rotate the table K about the spindle 18.

A series of radial partitions 22 projected vertically from the table K constitutes the walls of a series of shock forming compartments. The inner ends of these partitions 22 connect with a tubular extension 23 which is tapered to conform to the shock.

A series of arms 24 is pivoted at one end to the outer ends of the partitions 22, one for each shock forming compartment and have their free ends constructed to be projected into the said shock forming compartment by suitably disposed springs 25.

Short arms 26 project from the pivoted ends of the arms 24 and are adapted to engage with and travel upon an inclined track 27 for the purpose of projecting the free ends of the arms 24 across the passage or chamber J to engage with the stalks located therein to sweep the same into the shock forming compartment. The forward end of the inclined track 27 is formed on a gradual curve 28 on which the short arm 26 travels to permit the free ends of the arms 24 to gradually approach the plane in which the table K travels to sweep the stalks onto the shock forming compartments without interference of the said arms 24 with the guards 15 or other portion of the machine. The arms 24 are slightly curved in their length and have their outer ends curved in opposite direction to the main portion. The lateral extension 29 provided on the inner side of the arms 24 engages with the stalks and prevents the same approaching too close to the pivotal supports of the arms 24. There will be two sets of these arms 24 for each partition as shown most clearly in Figs. 1 and 3 for the purpose of engaging with the stalks near their upper and lower ends to hold the same in an erect position while being swept from the passage or chamber J into the shock forming compartment.

As the machine is drawn over the field the table K is rotated by means of gearings 20 and 21, and the gathering arms 2 are actuated by the instrumentalities herein set forth. The gathering arms 2 sweep the stalks into the passage or chamber J, and the arms 24 sweep the said stalks from the passage or chamber J into the shock forming compartment. After the shock has reached the desired dimensions it is temporarily bound and deposited on the ground by the following instrumentalities, which consist of a swinging derrick 30 having a windlass 31 at one side on which is adapted to wind ropes or cords 32 and 33 which pass over suitable guide pulleys on the cross beam 30' of the derrick, a spool 35 journaled in the bale 36 attached to the lower end of the rope or cord 32, a ring 34 attached to the lower end of the rope or cord 33, ropes or cords 36$^a$ and 37 adapted to wind upon the spool 35, the rope or cord 37 attached to the ring 34 and the rope or cord 36$^a$ having a ring 38 at its free end and a bar 39 pointed at one end and having a handle at the opposite end and adapted to be thrust through the spool 35 for the purpose of rotating the latter and winding up the cords 36$^a$ and 37 upon the spool 35. After the shock has been formed upon the table A the cords 36$^a$ and 37 are passed around the shock in opposite directions and the rings 34 and 38 overlapped and the bar 39 is thrust through the shock the point passing through the rings 34 and 38 thereby holding the same together.

The bar 39 is rotated to tighten the cords 36$^a$ and 37 about the shock. The shock being temporarily bound is elevated by operating the windlass 31 and is deposited upon the ground by swinging the derrick 30 to the rear of the machine, and releasing the windlass 31.

Having thus described my invention, what I claim, and desire to secure by Letters Patent, is—

1. In a corn harvester having the cutting and gathering mechanism located at its forward end, and having a transverse passage or chamber immediately in the rear of the said cutting and gathering mechanism, the combination of a rotatable shock forming table, a series of arms having yielding connection with the said table, and means for throwing the free ends of the said arms outward to project into the said transverse passage and sweep the stalks therefrom onto the shock forming table, substantially as described.

2. In a corn harvester having a cutting and gathering mechanism located at its forward end, and having a transverse passage or chamber immediately in the rear of the said cutting and gathering mechanism, the combination of a rotatable table located in the rear of said transverse passage, a series of radial partitions constituting the walls of shock forming compartments, and a series of arms, one for each compartment, pivotally supported at the outer ends of the said partitions and constructed to project into the said transverse passage and sweep the stalks therefrom into the said shock forming compartments, substantially as set forth.

3. In a corn harvester having a transverse passage or chamber J, the combination of a rotatable table located in the rear of said transverse passage, a series of arms pivoted on the said table and adapted to sweep the stalks from the said transverse passage onto the shock forming table and having short arms, springs for actuating the said arms and an inclined track to engage with the said short arms, substantially as described for the purpose set forth.

4. In a corn harvester having a transverse passage, the combination of a rotatable table, and a series of arms pivoted upon and carried by said table, and having lateral extensions on their inner sides, substantially as described for the purpose specified.

5. In a corn harvester having a transverse passage, the combination of a series of arms pivotally supported upon and carried by a rotatable table, and having short arms projected from their pivotal ends, and an inclined track having its forward end gradually curved for the said short arm to travel upon to gradually withdraw the sweeping arms from the said transverse passage, substantially as described for the purpose specified.

6. In a corn harvester having a transverse passage, and having curved guards at the ends of said transverse passage and a yielding support in the rear thereof, the combination of a rotatable table having a series of partitions to form compartments, a series of curved arms pivoted at one end at the outer ends of the said partitions, and having short arms projected from their pivotal ends, springs for projecting the free ends of the sweeping arms into and across the said compartments, and an inclined track having its forward end curved, substantially as shown, to engage with the short arm and control the movements of the sweeping arms when removing the stalks from the said transverse passage onto the shock forming table, substantially in the manner set forth.

In testimony whereof I affix my signature in presence of two witnesses.

WILLIAM K. LIGGETT.

Witnesses:
   ISOM FINLEY,
   JOHN CROWE.